Sept. 23, 1952 R. K. LOCKHART 2,611,872
SAWTOOTH WAVE GENERATOR
Filed March 31, 1949

INVENTOR
Robert K. Lockhart
BY
ATTORNEY

Patented Sept. 23, 1952

2,611,872

UNITED STATES PATENT OFFICE 2,611,872

SAWTOOTH WAVE GENERATOR

Robert K. Lockhart, Collingswood, N. J., assignor to Radio Corporation of America, a corporation of Delaware Application March 31, 1949, Serial No. 84,526

4 Claims. (Cl. 250—36)

1

The present invention relates to generators for producing non-sinusoidal waves and more particularly, but not necessarily exclusively, to such generators for producing linear sawtooth waves.

In accordance with the present invention novel means are provided for obtaining compensation for the wave form of the output of a sawtooth wave generator so that a linear deflection of a cathode ray beam, for example, can be produced.

The principal aim or object of the present invention is to provide novel means for compensation in the production of a sawtooth wave form whereby a linear sawtooth is obtained.

Another object is to provide a novel wave form compensation means for blocking oscillator.

A further object is to provide a blocking oscillator with a cathode compensation circuit including a condenser which charges during retrace time and discharges during the forward trace time to add its voltage wave form algebraically to the voltage appearing on the plate of the blocking oscillator to produce a linear sawtooth wave.

Figure 1:
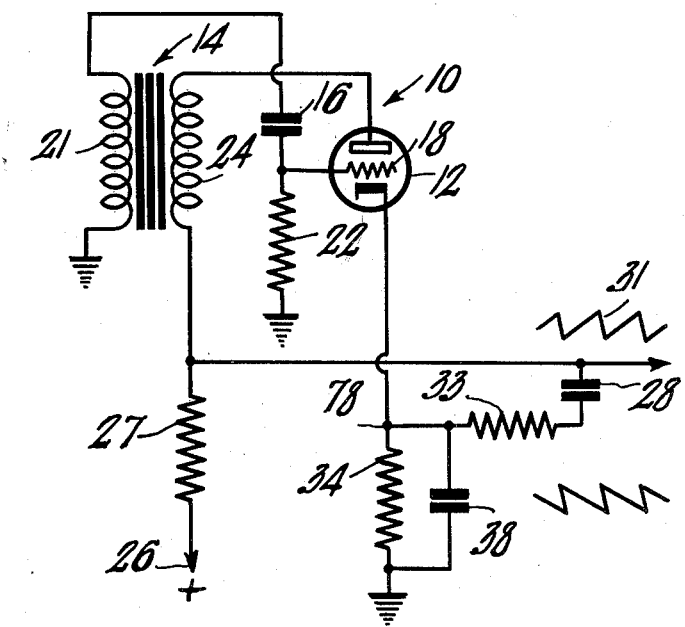
Figure 2:
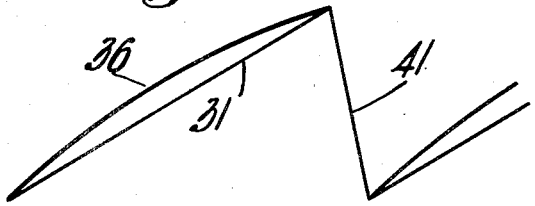

Other objects and advantages of the present invention will, of course, become apparent and immediately suggest themselves to those skilled in the art to which the invention is directed from a reading of the following specification in connection with the accompanying drawings in which:

Fig. 1 is a diagrammatic illustration of a sawtooth generator embodying the invention, and Fig. 2 shows conventionally the output wave form of the generator of Fig. 1 when operating in accordance with the invention.

Referring to Fig. 1 of the drawings, there is shown by way of example a blocking oscillator 10 comprising an oscillator tube 12. The electrode circuits of the tube 12 are connected substantially as shown in Tolson Reissue Patent Re. 20,338 so that it can function as a "blocking oscillator." A blocking oscillator is also shown and described by Tolson et al. in U. S. Patent No. 2,101,520, granted December 7, 1937. A transformer 14, preferably having an iron core as indicated on the drawing, provides an inductive coupling between the grid and plate circuits. A blocking condenser 16 is connected, as shown, between the grid 18 of the tube 12 and the grid winding 21 of the transformer 14. A resistance 22 which may be adjustable, if desired, provides a leakage path to ground for the electrical charge stored in the condenser 16. The plate circuit of the tube 12 includes the primary 24 of the transformer 14 and terminates at the positive terminal of a D. C. voltage supply source (not shown)

2 as indicated schematically at 26. The plate circuit of the tube 12 also includes a resistor 27.

The functioning of the tube 12 with a circuit arrangement shown is such as to produce current pulses which cause a sawtooth voltage wave to appear across a condenser 28. The previously mentioned resistor 27 controls the charging cycle of the condenser 28. The sawtooth voltage wave across the condenser 28 is indicated conventionally at 31 and is substantially linear in accordance with the invention as will be pointed out in connection with Fig. 2 of the drawing. The voltage wave 31 is of a shape which will be effective to cause deflection in the cathode ray beam in any well-known manner, for example, as shown in the Tolson reissue patent mentioned above. Since the sawtooth voltage wave 31 is substantially linear, the oscillator of Fig. 1 of the drawings embodying the invention is particularly suited for use with a control deflection arrangement of the type shown in U. S. Patent No. 2,587,313 issued to G. L. Grundmann on February 26, 1952, for Automatic Control of Wave Form.

In general, with a blocking oscillator, not including the improvement of the present invention, the condenser 28 is charged from the positive potential applied to the terminal 26 through resistor 27 and resistor 33 with point 78 grounded. This charging curve 36 can be no more linear than a small portion of the exponential charge curve of a condenser. When the tube 12 becomes conductive during one part of the well-known blocking oscillator cycles, the condenser 28 is discharged more or less abruptly. The charging curve for the condenser 28 is represented by the line 36 of the wave form 31 as shown in Fig. 2 of the drawings. While the conventionally shown wave form 31, as shown in Figs. 1 and 2 does not take into account the presence of the resistor 33, it may serve to provide high-peaking where the form of voltage 31 is to be of the shape required to cause a sawtooth current wave to pass through an inductive circuit having resistance, for example, the circuit represented by the primary winding of a deflection transformer.

In accordance with the invention, the exponential curvature 36 is corrected by the addition of an additional sawtooth whose curvature is equal and opposite to that of the exponential curve 36. This is accomplished in accordance with the present invention by a parallel resistor condenser combination having a selected time constant. This parallel combination is added, as shown, in the cathode circuit of the discharge tube and comprises the previously mentioned resistor 34 and a condenser 38. The condenser 38 charges during the retrace time 41 of the wave 31 and discharges during the forward trace time 36 to add its voltage wave form algebraically to that of the plate of the tube 12 to provide linearity of wave form shown illustratively as the wave 31 in Figs. 1 and 2 of the drawings. At the beginning of each cycle of the wave 31 represented by the initiation of the charging of the condenser 28 the voltage across the condenser 38 is at its maximum value, thus reducing the effective charging voltage at the point 26 toward which the condenser 28 starts to charge. As the charge on the condenser 28 increases, the charge on the condenser 38 decreases so that the effective charge voltage increases. It will thus be seen that the inherently known linear charging curve of the condenser 28 is corrected for in accordance with this invention.

A time constant of the resistor condenser combination 34—38 is given by the expression where:

$$RC = \frac{T}{3}$$

T = period of the charging time of condenser 28 (time duration of curve 36).

What is claimed is:

1. An oscillator for producing a voltage of sawtooth waveform comprising a vacuum tube having a cathode, a control electrode, and an anode, an anode circuit connected to said anode, a control electrode circuit connected to said control electrode, means for coupling said control electrode circuit and said anode circuit, a source of positive potential for said anode circuit, a resistor in said anode circuit, one terminal of said resistor being connected to said source of positive potential, a condenser having one terminal thereof connected to the terminal of said resistor opposite the terminal connected to said source of positive potential, means connecting the other terminal of said condenser directly to said cathode, said condenser being periodically discharged upon establishing flow of current in said anode circuit, a time constant combination comprising a resistance and a condenser in parallel, one terminal of said combination being connected to said cathode, the other terminal of said combination being connected to a voltage reference point in said circuit, said time constant combination having a time constant $$RC = \frac{T}{3}$$

where T is equal to the time of the sawtooth wave represented by the charging time of said first named condenser.

2. An oscillator for producing a voltage of sawtooth waveform comprising a vacuum tube having a cathode, a control electrode, and an anode, an anode circuit connected to said anode, a control electrode circuit connected to said control electrode, means for coupling said control electrode circuit and said anode circuit, a source of positive potential for said anode circuit, a resistor in said anode circuit, one terminal of said resistor being connected to said source of positive potential, a condenser having one terminal thereof connected to the terminal of said resistor opposite the terminal connected to said source of positive potential, a second resistor, the other terminal of said condenser being connected through said second resistor directly to said cathode, said condenser being periodically discharged upon establishing flow of current in said anode circuit, a time constant combination comprising a resistance and a condenser in parallel, one terminal of said combination being connected to said cathode, the other terminal of said combination being connected to a voltage reference point in said circuit, said time constant combination having a time constant $$RC = \frac{T}{3}$$

where T is equal to the time of the sawtooth wave represented by the charging time of said first named condenser.

3. An oscillator for producing a voltage of sawtooth waveform comprising a vacuum tube having a cathode, a control electrode, and an anode, an anode circuit connected to said anode, a control electrode circuit connected to said control electrode, means for coupling said control electrode circuit and said anode circuit, a source of positive potential for said anode circuit, a resistor in said anode circuit, one terminal of said resistor being connected to said source of positive potential, a condenser having one terminal thereof connected to the terminal of said resistor opposite the terminal connected to said source of positive potential, a second resistor, the other terminal of said condenser being connected through said second resistor directly to said cathode, said condenser being periodically discharged upon establishing flow of current in said anode circuit, a time constant combination comprising a resistance and a condenser is parallel, one terminal of said combination being connected to said cathode, the other terminal of said combination being connected to a voltage reference point in said circuit.

4. An oscillator for producing a voltage of sawtooth waveform comprising a vacuum tube having a cathode, a control electrode, and an anode, an anode circuit connected to said anode, a control electrode circuit connected to said control electrode, a transformer coupling said control electrode circuit and said anode circuit, a source of positive potential for said anode circuit, a resistor in said anode circuit, one terminal of said resistor being connected to said source of positive potential, a condenser having one terminal thereof connected to the terminal of said resistor opposite the terminal connected to said source of positive potential, a second resistor, the other terminal of said condenser being connected through said second resistor directly to said cathode, said condenser being periodically discharged upon establishing flow of current in said anode circuit, a time constant combination comprising a resistance and a condenser in parallel, one terminal of said combination being connected to said cathode, the other terminal of said combination being connected to a voltage reference point in said circuit.

ROBERT K. LOCKHART.

REFERENCES CITED

The following references are of record in the file of this patent:

UNITED STATES PATENTS

| Number | Name | Date |
|---|---|---|
| 2,188,653 | Faudell et al. | Jan. 30, 1940 |
| 2,233,596 | Faudell | Mar. 4, 1941 |
| 2,396,439 | Schlesinger | Mar. 12, 1946 |
| 2,411,062 | Schade | Nov. 12, 1946 |
| 2,438,845 | Dodds et al. | Mar. 30, 1948 |